US012761327B2

(12) United States Patent
Fabiny

(10) Patent No.: US 12,761,327 B2

(45) Date of Patent: Oct. 13, 2026

(54) METHOD AND APPARATUS FOR REDUCING BLOOMING IN LIDAR SYSTEMS

(71) Applicant: OPSYS Tech Ltd., Holon (IL)

(72) Inventor: Larry Fabiny, Boulder, CO (US)

(73) Assignee: OPSYS Tech Ltd., Holon (IL)

( * ) Notice: Subject to any disclaimer, the term of this patent is extended or adjusted under 35 U.S.C. 154(b) by 384 days.

(21) Appl. No.: 18/632,602

(22) Filed: Apr. 11, 2024

(65) Prior Publication Data

US 2024/0345223 A1 Oct. 17, 2024

Related U.S. Application Data

(60) Provisional application No. 63/496,061, filed on Apr. 14, 2023.

(51) Int. Cl.

*G01S 17/931* (2020.01)
*G01S 7/481* (2006.01)
*G01S 7/4863* (2020.01)

(52) U.S. Cl.

CPC .......... *G01S 7/4816* (2013.01); *G01S 7/4863* (2013.01)

(58) Field of Classification Search

CPC ....... G01S 7/4816; G01S 7/4863; G01S 17/89
See application file for complete search history.

(56) References Cited

U.S. PATENT DOCUMENTS 10,514,444 B2 12/2019 Donovan
10,761,195 B2 9/2020 Donovan
11,016,178 B2 5/2021 Donovan
11,513,195 B2 11/2022 Donovan et al.
(Continued)

FOREIGN PATENT DOCUMENTS

CN 114942449 A 8/2022
KR 10-2021-0092212 A 7/2021
(Continued)

OTHER PUBLICATIONS

International Search Report and Written Opinion received for corresponding PCT Application No. PCT/US2024/024002, mailed on Aug. 1, 2024, 8 pages.

(Continued)

*Primary Examiner* — Isam A Alsomiri

(74) *Attorney, Agent, or Firm* — Rauschenbach Patent Law Group, PLLC; Kurt Rauschenbach

(57) ABSTRACT

A LiDAR receiver includes an optical element configured with an optical power that projects light rays received at an input to a region where the received light rays overlap. An apodized aperture in the region where the received light rays overlap is configured with an optical transmission profile that changes radially across the apodized aperture to provide a desired modulation of the overlapped received light rays. Detector optics positioned adjacent to the apodized aperture focuses the modulated light rays at a detector plane. A two-dimensional pixelated detector array is positioned at the detector plane. The detector optics and desired modulation are chosen so that a ratio of an intensity of modulated light rays on one pixel of the two-dimensional array of pixels to an intensity of modulated light rays on an adjacent pixel of the two-dimensional array of pixels is a desired value.

22 Claims, 5 Drawing Sheets

(56) References Cited

U.S. PATENT DOCUMENTS

| | | | |
|---|---|---|---|
| 11,802,943 | B2 | 10/2023 | Donovan |
| 11,846,728 | B2 | 12/2023 | Donovan et al. |
| 11,906,663 | B2 | 2/2024 | Donovan et al. |
| 11,965,964 | B2 | 4/2024 | Donovan et al. |
| 12,055,629 | B2 | 8/2024 | Donovan |
| 12,523,774 | B1 * | 1/2026 | Terefe .................. G01S 7/4816 |
| 2015/0131080 | A1 | 5/2015 | Retterath et al. |
| 2015/0276923 | A1 | 10/2015 | Song et al. |
| 2018/0284244 | A1 | 10/2018 | Russell et al. |
| 2020/0041614 | A1 | 2/2020 | Donovan et al. |
| 2020/0124711 | A1 | 4/2020 | Rezk et al. |
| 2020/0150209 | A1 * | 5/2020 | Kirillov .................. G01S 17/42 |
| 2021/0033708 | A1 | 2/2021 | Fabiny |
| 2021/0124960 | A1 | 4/2021 | Lee et al. |
| 2021/0234342 | A1 | 7/2021 | Donovan |
| 2021/0263137 | A1 | 8/2021 | Dehlinger et al. |
| 2021/0278540 | A1 | 9/2021 | Maayan et al. |
| 2022/0146680 | A1 | 5/2022 | Donovan et al. |
| 2022/0187457 | A1 | 6/2022 | Daami et al. |
| 2022/0291359 | A1 | 9/2022 | Tziony et al. |
| 2022/0365219 | A1 | 11/2022 | Maayan et al. |
| 2023/0213610 | A1 * | 7/2023 | Eberspach ......... G01B 11/2513 |
| 2023/0266450 | A1 * | 8/2023 | Maayan ................ G01S 7/4815 356/5.01 |
| 2024/0319343 | A1 * | 9/2024 | Jaakkola ................. G01S 17/10 |

FOREIGN PATENT DOCUMENTS

| | | | | |
|---|---|---|---|---|
| KR | 10-2023-0009452 | A | 1/2023 | |
| WO | 2019/178136 | A1 | 9/2010 | |
| WO | WO-2023072905 | A1 * | 5/2023 | ............. G01S 17/46 |
| WO | 2023/159133 | A1 | 8/2023 | |
| WO | 2024/215843 | A1 | 10/2024 | |

OTHER PUBLICATIONS

International Preliminary Report on Patentability received for PCT Application No. PCT/US2024/024002, mailed on Oct. 23, 2025, 5 pages.

* cited by examiner

METHOD AND APPARATUS FOR REDUCING BLOOMING IN LIDAR SYSTEMS

CROSS-REFERENCE TO RELATED APPLICATION

The present application claims benefit of U.S. Provisional Patent Application Ser. No.: 63/496,061 filed on Apr. 14, 2023, entitled "Method and Apparatus for Reducing Blooming in LiDAR Systems". The entire contents of U.S. Provisional Patent Application Ser. No. 63/496,061 are incorporated herein by reference.

INTRODUCTION

Autonomous, self-driving, and semi-autonomous automobiles and numerous other fixed and mobile systems requiring mapping of the surrounding environment use a combination of different sensors and technologies such as radar, image-recognition cameras, and sonar for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LiDAR) systems take a critical role, enabling real-time, high-resolution 3D mapping of the surrounding environment.

LiDAR systems need to be able to perform under a variety of environmental and driving conditions, including situations that include combinations of near and far distances of objects and various weather and ambient lighting conditions. It is important that the LiDAR be able to provide accurate object size information in these and other conditions. Collecting data from various optical sensors, including those used in LiDAR systems, gives rise to the need for optical systems and signal processing that compensates for optical artifacts, such as blooming and ghost imaging, that distort optical images.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

DESCRIPTION OF VARIOUS EMBODIMENTS

Figure 1:
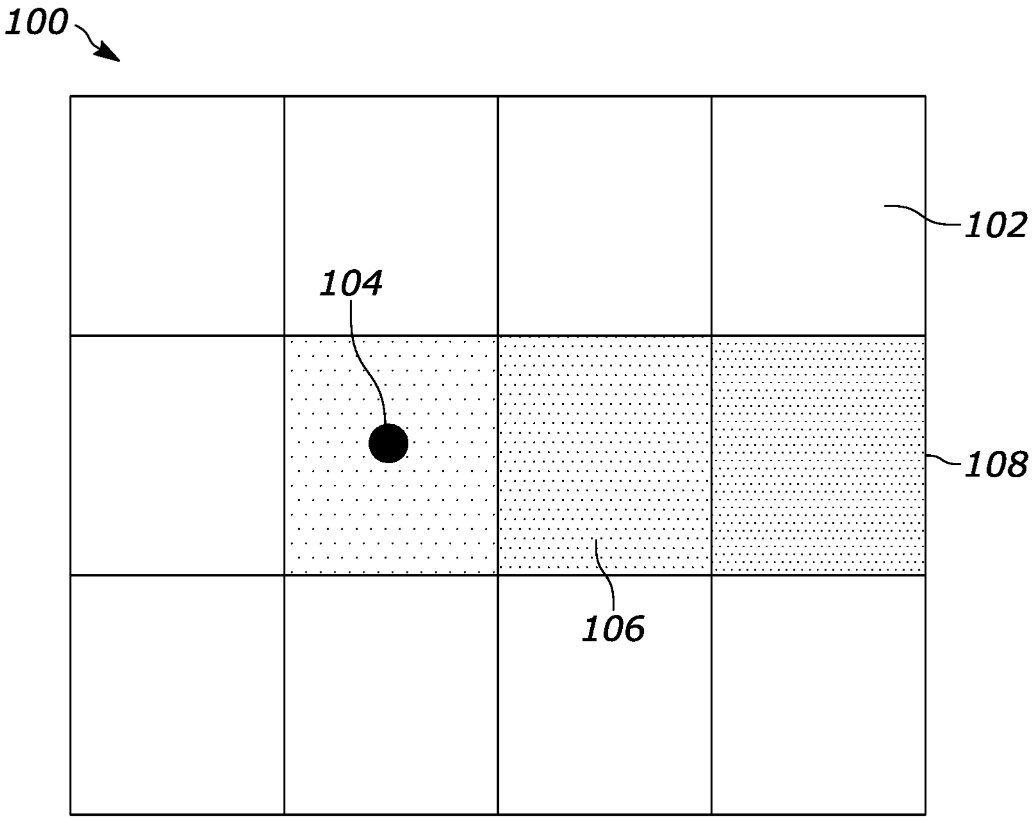
FIG. 1 shows a portion of a pixel map of a single-photon avalanche diode (SPAD) detector illustrating a cause of undesirable blooming in receivers in known LiDAR systems.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

LiDAR systems for autonomous cars must be capable of performing with high accuracy under a variety of driving scenarios and lighting conditions. For example, accurate range and image data that can be in the form of a three-dimensional point cloud must be obtained for a highly reflective traffic cone a few meters away, as well as a dark non-reflective vehicle tire lying in the roadway, one hundred fifty meters distant. From an optical perspective, these two scenarios present vastly different optical powers to the input of the sensor system.

An optical effect that can greatly impact performance of a LiDAR system is commonly referred to as "blooming". Blooming occurs when relatively intense light from a point or region illuminated by the LiDAR system or, even from another source, propagates to inputs of the imaging sensors with an optical power that is high enough to cause saturation of the LiDAR detectors. In actual driving scenarios, objects with high reflectivity are very commonly encountered. For example, in city traffic, highly reflective traffic signs can be encountered every few minutes. Automotive LiDAR sensors are particularly sensitive to high-intensity reflected light from such objects. In practice, these reflected signals from relatively close and/or highly reflective objects commonly saturate the detectors causing blooming.

There are two relevant types of blooming in LiDAR systems. The first type of blooming is electronic blooming that occurs in conventional CCD sensors when intense light illuminates only a single detector pixel. When the light reaches a certain intensity, the single detector pixel will generate sufficient electrical charge to overcome the electrical isolation between pixels. In such a case, adjacent pixels will register as being illuminated despite the absence of light illuminating the adjacent pixels.

The second type of blooming in LiDAR systems is optical blooming, where adjacent pixels are illuminated with light due to the non-ideality of the input focusing optics. This is, at least in part, because the wave nature of light does not permit perfect focus. In practical systems, the focused optical beam will have tails that extend well beyond the apparent size of the focused light. Sensors with extremely high dynamic range such as a SPADs are susceptible to optical blooming because the SPAD can detect the tails of the focused optical beams that fall on adjacent pixels. Charge coupled device detectors are much less likely to experience optical blooming because they have limited dynamic range when compared to SPADs.

More specifically, the LiDAR system processor generates a data point data map from the LiDAR data processing system. A data point map is a dataset, which is collected by the LiDAR system and processed by the LiDAR processor, that represents the particular geographical area and terrain in the LiDAR field-of-view being scanned by the LiDAR system. The term "blooming" can refer to the situation when the point cloud determined by the LiDAR system processor represents an image having an outline of the actual highly reflective object that exhibits enlargement or dilation in the area surrounding the highly reflective object. The result is a point cloud that represents an image that is larger than the actual size of the image that would be represented without a blooming condition.

The enlargement of dilation of the image can be caused, for example, by light beams that fall outside the central region of the image, for example light rays spread by diffraction from LiDAR system components. The intensity from light rays that fall within the central region of the image can be directed over one pixel of the pixelated detector. The intensity from light rays that fall outside the central region can fall on a pixel or pixels that are adjacent to the one pixel.

In addition, optical blooming can result in the formation of "ghost" images. Ghost imaging occurs when a highly reflective object enters the LiDAR system field-of-view and enough light is detected and processes by the LiDAR system to form "ghost" point cloud data sets representing the object with the same or similar shape and size but at different locations in the point cloud map representing different physical locations. For different types of LiDAR sensors, the location of "ghosts" in the point cloud is often different. Here again, these "ghosts" can be caused by light rays that fall outside the central region of the image and illuminate pixels that are adjacent to a central pixel of the image.

In addition to blooming and ghost imaging, current LiDAR systems receiving a large dynamic range of reflected and ambient light generate imperfect point cloud data. One type of imperfect point cloud data is referred to as "point cloud distortion", which results in inaccurate ranging that causes the LiDAR system to report inaccurate information. The other type of imperfect point cloud data is referred to as "point cloud missing data", which results in objects being undetected at certain distances. The result of the generation of the imperfect point cloud data is that the LiDAR system reports data to the driver with "blind spots". These "blind spots" are missing object and ranging information that can result a danger to the driver and/or unnecessary actions being taken by the vehicle, such as automatic braking and lane changes.

FIG. 1 shows a portion of a pixel map 100 of a single-photon avalanche diode (SPAD) detector illustrating a cause of undesirable blooming in receivers in known LiDAR systems. Single-photon avalanche diodes are commonly used in solid state LiDAR systems. One feature of SPAD detectors is that they can detect at the single-photon level, which means that the SPAD will detect light from the low-intensity light tails that are around the focused spot. This is in contrast to standard CCD detector arrays that are not sensitive to extremely low light levels.

The squares 102 indicate pixels that are arranged in a two-dimensional spatial arrangement of SPAD pixels. In this illustration, a point target 104 is shown with its image centered on one pixel, which we refer to as the main receiver pixel. For the purposes of this description, the target is assumed to be a single point at infinity. The first 106 and second adjacent rows of receiver pixels 108 are shown in the pixel map 100. The term "blooming" as described herein is shown on the pixel map 100 as some focused light that extends onto pixels other than the target pixel, such as a pixel 106 in the first adjacent row and a pixel 108 in the second adjacent rows of receiver pixels 102 of the pixel map 100.

Figure 2A:
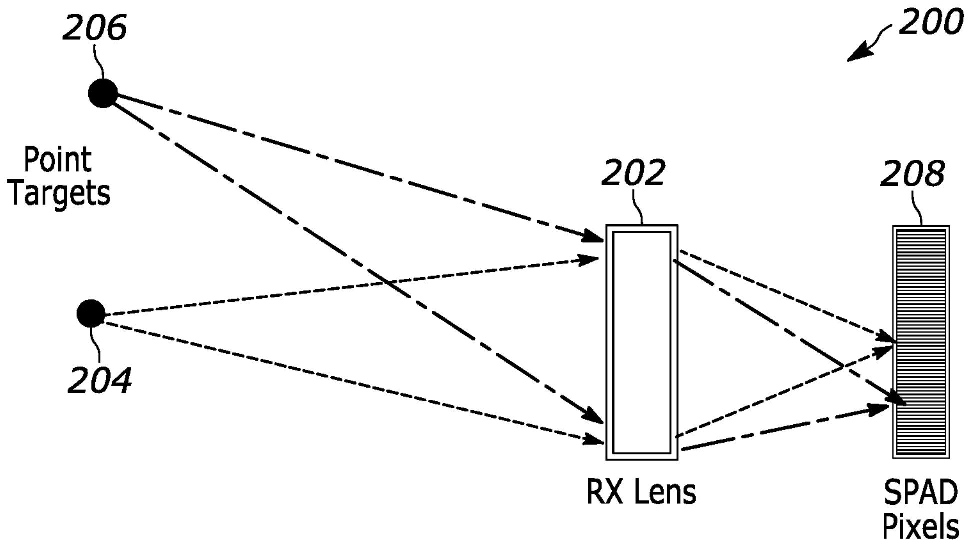
FIG. 2A is a schematic diagram of a LiDAR receiver showing receiver optics and a SPAD detector array.

FIG. 2A is a schematic diagram of a LiDAR receiver 200 showing receiver optics and a SPAD detector array. The receiver optics is shown as a lens 202 illustrated as gathering light from two point targets 204, 206. The lens 202 then focuses light in transmission to a SPAD detector array 208 configured with rows and columns of pixels as shown in FIG. 1. The SPAD detector array 208 is positioned one focal length away from the lens 202 so that the point targets 204, 206 are imaged onto pixels in the SPAD detector array 208. It should be understood that the schematic diagram of a LiDAR receiver 200 does not accurately represent the scale of the distances and component sizes. Although not evident in the schematic diagram of a LiDAR receiver 200, the rays from the point targets 204, 206 are essentially parallel rays as they are positioned a distance from the lens 202 that is much greater than the focal length of the lens, approaching infinity for the ideal case. In practical configurations, rays from point target 204 are nearly parallel, and rays from point target 206 are nearly parallel, but the rays from point target 204 and the rays from point target 206 are not parallel to each other.

Figure 2B:
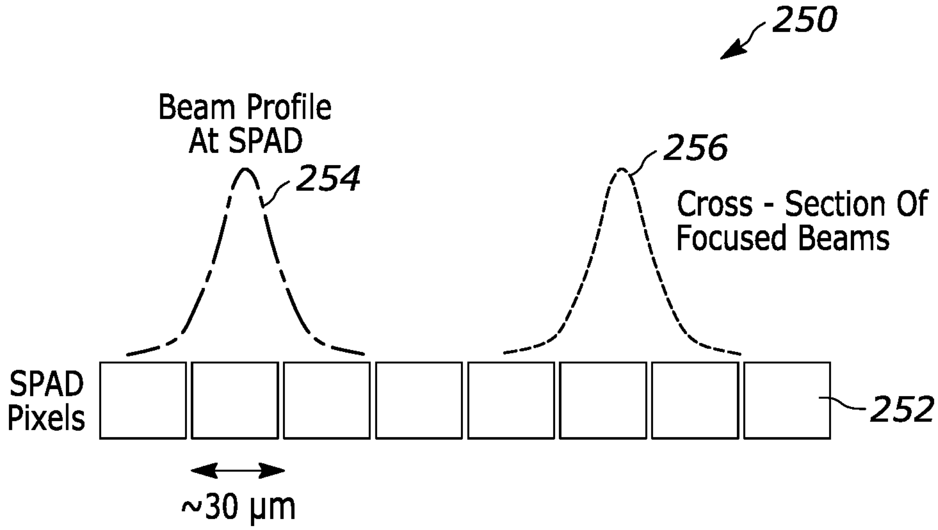
FIG. 2B is a diagram of optical beam profiles at a SPAD detector array.

FIG. 2B is a diagram of optical beam profiles 250 at a SPAD detector array. A row of SPAD pixels is shown where each pixel 252 has a length and width of 30 microns. No lens can focus a optical beam to a perfect point with zero width. Any focused spot has some width. The spot size can be minimized to some extent. However, as a practical matter, any real target that is imaged will have light spill onto adjacent SPAD pixels to at least some extent.

Referring to FIG. 2A and 2B, the optical beam profile 250 shows a first optical beam 254 corresponding to the first point target 204 and a second beam profile 256 corresponding to the second point target 206. The first and second optical beam profiles 254, 256 show some level of optical power extending into adjacent pixels of the SPAD detector array. Optical power experienced by a pixel in the SPAD detector array can be obtained by numerical integration of the two dimensional power distribution that falls on the desired pixel. The power distribution is represented schematically in one-dimension as profiles 254, 256 in FIG. 2B.

One object of the present teaching is methods and apparatus to mitigate the effects of blooming, ghost imaging, point cloud distortions, and point cloud missing-data events in LiDAR system. In one aspect of the present teaching, apodized apertures or filters are used to achieve these goals. The term "apodized" as used herein in conjunction with the term "aperture" refers to when the aperture has a gradual transmission change from 100% to 0% instead of a hard "on-off" transition. The transmission change can occur radially across the aperture, and have circular symmetry. So light rays passing through the center of the aperture experience a different transmission, or optical density, then light rays at or near the edge of the aperture. The term "apodized" as used herein in conjunction with the term "filter" refers to when an optical filter is constructed with a port that has a gradual transmission change from 100% to 0% instead of a hard "on-off" transition. In practice, apodizing a sharp aperture or port of a filter will suppress long tails at the image plane by suppressing diffraction artifacts produced by sharp edges. Another feature of the apodized aperture is that the intensity of light away from the center of a central spot in an image plane of the aperture is suppressed. Consequently, a ratio of the intensity of light that hits the image plane away from a central spot to the intensity at the peak of the central spot is small and can be controlled based on the transmission profile of the apodized aperture. This ratio for an apodized aperture is substantially smaller as compared to the same ratio for a conventional hard stop aperture. The result is that improvements in resolution over the diffraction limit of a conventional aperture or filter port can be achieved because the diffraction limit assumes sharp transition, which then creates ripples in the intensity at the edges. Thus, an apodized filter comprising an apodized aperture according to the present teaching is configured to reduce or even substantially eliminate undesirable intensity variations in optical systems caused by diffraction and other optical effects, and in particular, those caused by a hard-stop aperture.

In one specific embodiment, the apodized filter of the present teaching is a gradient filter designed to reduce or substantially eliminate undesirable intensity variations in optical systems caused by diffraction and other optical effects. For example, the gradient filter can be a continuously variable gradient filter where the optical density varies across the substrate. Such filters are commercially available from, for example, Reynard Corporation, San Clemente, CA. The gradient filter can also comprise a continuously variable pattern that results in varying optical density across the filter.

In one specific embodiment, the optical density of the apodized filter increases radially from a clear or relatively clear center area. In such filters, the light will be at its peak intensity at the center and then will gradually reduce intensity in the direction of the outer edges of the filter. In another specific embodiment, the optical density of the apodized filter is highest in the center with the optical density increases from the edge to the center of the filter.

In one specific embodiment, the apodized filter is designed for a Gaussian optical beam distribution or a combination of Gaussian optical beam profiles. However, in general, an apodized filter according to the present teaching can be configured for any type of optical beam profile.

Figure 3:
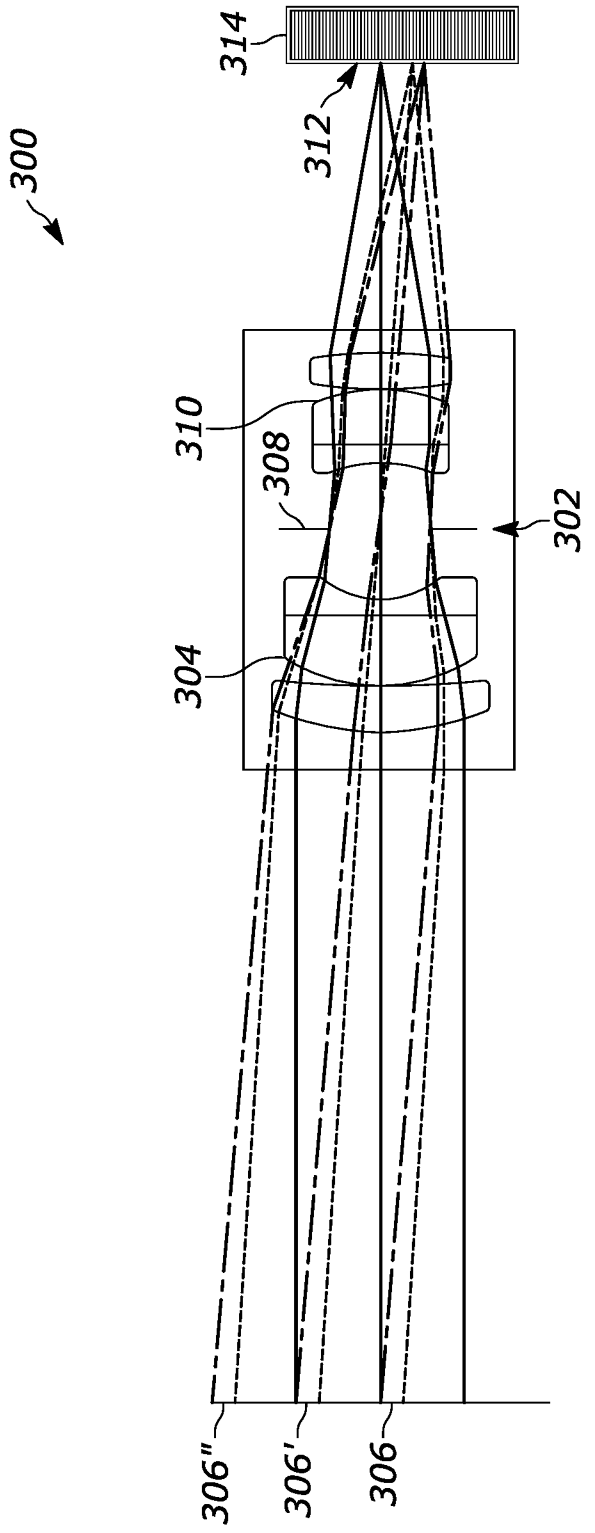
FIG. 3 illustrates a schematic diagram of a LiDAR receiver with an apodized filter configured according to the present teaching.

FIG. 3 illustrates a schematic diagram of a LiDAR receiver 300 with an apodized filter 302 configured according to the present teaching. The receiver 300 includes input optics 304 configured to receive light from targets 306, 306', 306". In the diagram shown in FIG. 3, ray tracing from three targets 306, 306' and 306" that are positioned at infinity for the purpose of this discussion is shown. The input optics 304 directs light from the targets 306, 306' and 306" to the apodized filter 302 that comprises a filter. The apodized aperture 302 having a desired optical transmission profile is positioned at a location where rays from the targets 306, 306' and 306" overlap. In one specific embodiment, the diameter at the 50% transmission location of the apodized aperture 302 with the desired optical transmission profile is the same as an aperture stop diameter for a known system with no apodized filter. The dimensions of a transition zone 308 of the apodized aperture 302, including both the shape and the width, are chosen to suppress a desired amount of diffraction artifacts produced by edges of the aperture stop. For example, in some embodiments, the width of the transition zone 308 is a few hundred microns.

Detector optics 310 are positioned after the apodized aperture 302 in the direction of propagation of the rays from the three targets 306, 306' and 306". The detector optics 310 focus the rays from the three targets 306, 306' and 306" to an image plane 312 of a SPAD detector array 314 that includes a two-dimensional array of pixels. Specifically, the detector optics 310 receives light rays at the image plane 312 that have been modulated by the apodized aperture. The detector optics have an optical power and are placed at a position between the apodized aperture 302 and the image plane 312 such that the modulated light rays can be projected to a detector positioned at the image plane, thereby forming a spot profile. The image plane 312 can be referred to as the detector plane. In some embodiments, the detector plane is at the focal plane of the detector optics.

Figure 4:
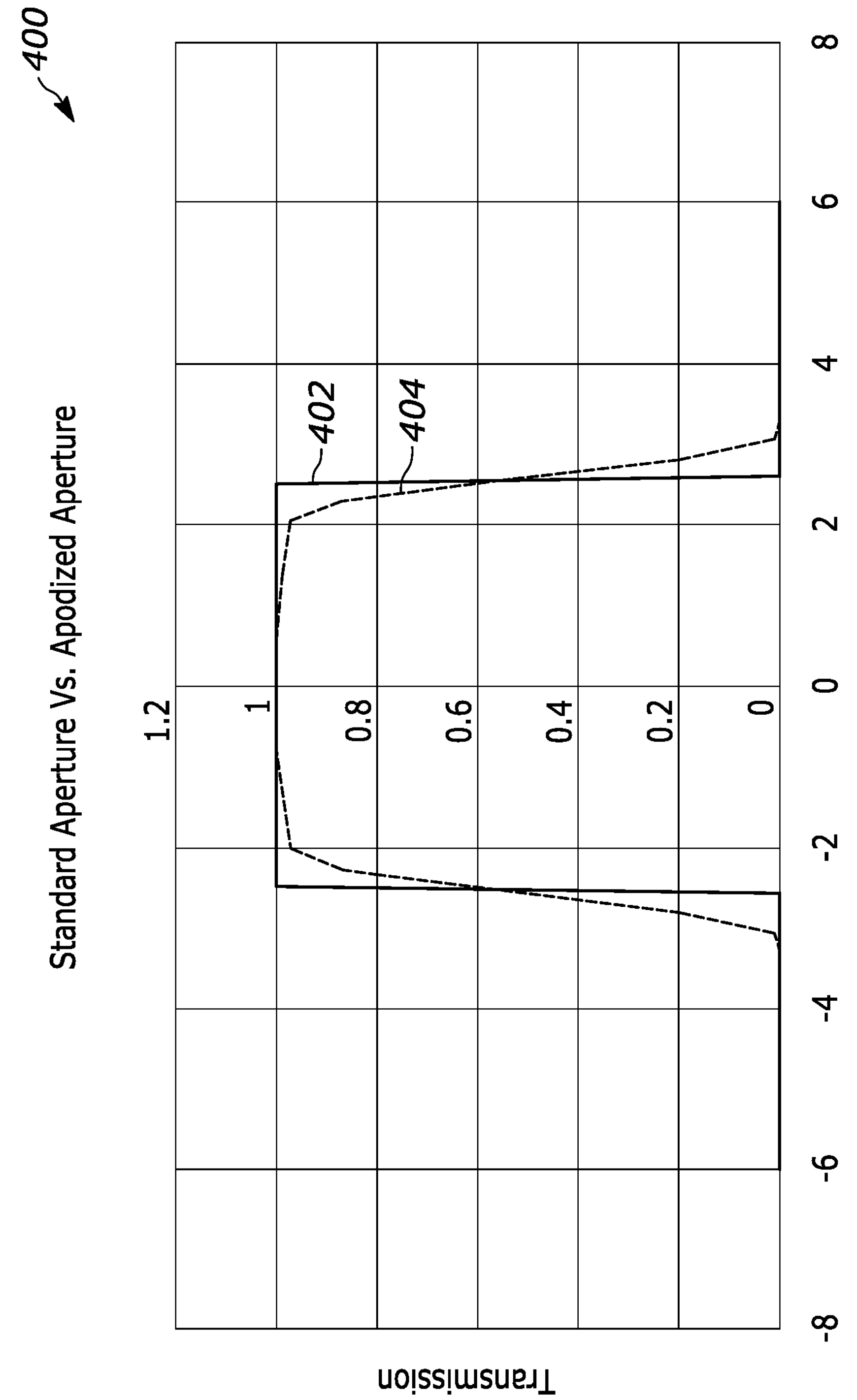
FIG. 4 illustrates a graph showing a comparison of optical power transmission of a standard aperture stop of a known system and an apodized aperture according to the present teaching as a function of distance across the aperture.

FIG. 4 illustrates a graph 400 showing a comparison of optical power transmission of a standard aperture stop of a known system and an apodized aperture according to the present teaching as a function of distance across the aperture. A first optical power transmission curve 402 is shown for standard aperture with a sharp edge. As expected, optical power abruptly changes from full transmission in the aperture to essentially zero transmission after outside of the aperture. A second optical power transmission curve 404 is shown for an apodized aperture according to the present teaching. For the apodized aperture filter function, the optical power more gradually transitions from full transmission to zero transmission as a function of distance across the aperture. In various embodiments of the present teaching, the apodized aperture is configured so as to provide a desired transmission characteristic to suppress a desired amount of diffraction artifacts produced by edges of the aperture stop. Said another way, the apodized aperture is configured to reduce the intensity of light in a region outside the central transmission region as compared to a system that does not use an apodized filter. As a result, in some embodiments, for a two-dimensional array of pixels positioned at a detector plane, a desired ratio of an intensity of the projected modulated light rays on one pixel of the two-dimensional array to an intensity of the projected modulated light rays on an adjacent pixel of the two-dimensional array of pixels can be achieved. For example, the intensity of the projected modulated light rays on an adjacent pixel of the two-dimensional array of pixels can be much lower than the intensity of the projected modulated light rays on one pixel of the two-dimensional array. For example, the one pixel can be closer to the center of an optical illumination on the detector array and the adjacent pixels are located closer to an edge of the optical illumination on the detector array.

In some embodiments, the apodized aperture is circularly symmetric around the center point. In these embodiments, the transmission as a function of distance changes radially across the aperture. In some embodiments, transmission is high in the center of the aperture and decreases gradually at the edges of the aperture which reduces the effects of diffraction at the edge of the aperture.

Figure 5:
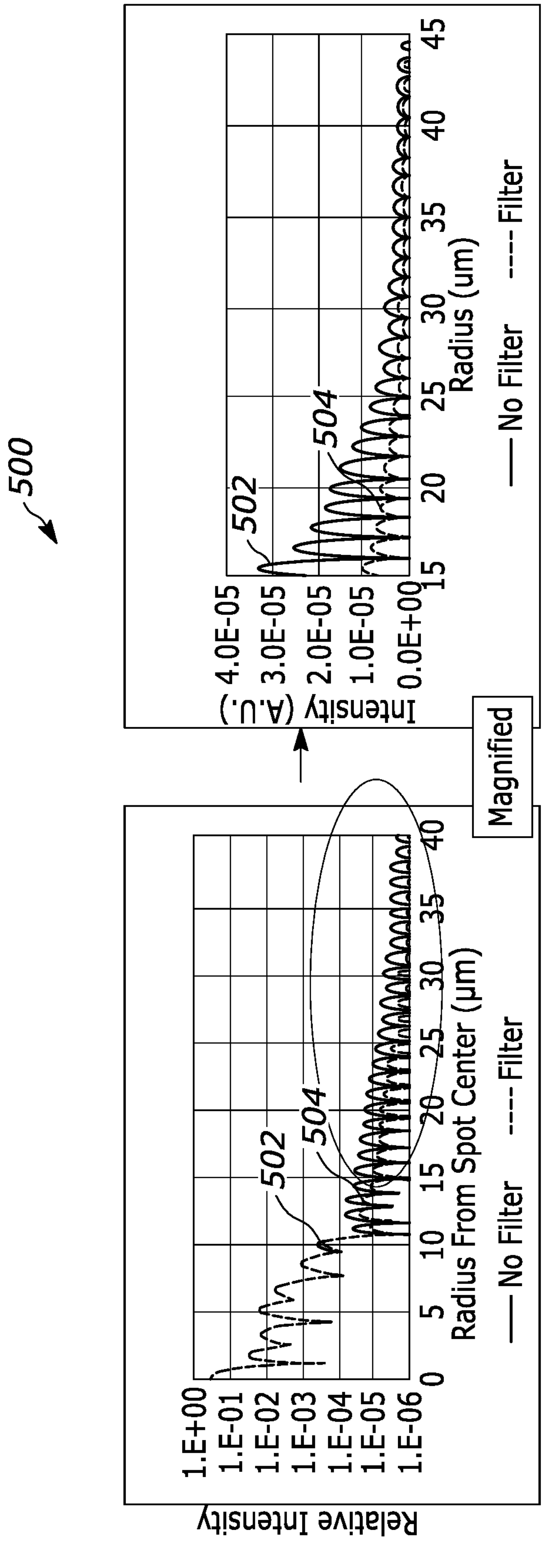
FIG. 5 illustrates graphs showing a comparison of relative intensity of light from a single point target that is focused and centered on a pixel of a SPAD detector array after passing through a conventional aperture and after passing through an apodized aperture filter according to the present teaching.

FIG. 5 illustrates graphs 500 showing a comparison of relative intensity of light from a single point target that is focused and centered on a pixel of a SPAD detector array in a spot profile after passing through a conventional aperture and after passing through an apodized aperture filter according to the present teaching. This spot profile results after the light rays that are modulated by the aperture are projected to a detector plane by detector optics. The relatively intensity of light is plotted as a function of distance from the center pixel of the array. In this particular SPAD detector array, the pixels are about 30 microns in length and width. Intensities shown from 15 to 45 microns represent intensities of light in an adjacent pixel.

The plot 502 illustrates relative intensity of light from a single point target that is focused and centered on the center pixel of a SPAD detector array after passing through a conventional aperture that approaches a step function transmission profile. More specifically, the plot 502 shows light transmission peaking at the center of the single pixel and then rapidly decreasing as a function distance to the edge of the single pixel at 15 microns. The relative intensity at the edge of the single pixel is down in the $10^{-4}$ range at the edge. The plot 502 also shows a magnified view of the relative intensity of light from the single point target focused and centered on the single pixel from 15-45 microns that illuminates the adjacent pixel. The relative intensity of light illuminating the adjacent pixel exceed $3*10^{-5}$ near the edge of the single pixel. When the relative intensity of the light is integrated over the area of the adjacent pixel, the power with the apodized aperture is reduced by ~5 dB relative to the conventional aperture, while the integrated power on the primary pixel is unchanged.

The plot 504 illustrates relative intensity of light from a single point target that is focused and centered on the pixel of a SPAD detector array after passing through an apodized aperture filter according to the present teaching. The plot 504, like the plot 502, shows light transmission peaking at the center of the single pixel and then rapidly decreasing as a function distance to the edge of the single pixel at 15 microns. The relative intensity at the edge of the single pixel is also down in the $10^{-4}$ range at the edge similar to the plot with the conventional aperture. The plot 504 also shows a magnified view of the relative intensity of light from the single point target focused and centered on the single pixel from 15-45 microns that illuminates the adjacent pixel. The magnified view of plot 504 shows that the relative intensity of light illuminating the adjacent pixel in the high $10^{-6}$ range near the edge of the single pixel, which is a significant improvement over the conventional aperture that approaches a step function shown in the plot 502. The plots 502, 504 clearly shows that the apodized filter significantly reduces the intensity of light caused by diffraction that enters into adjacent pixels of a SPAD detector array.

Thus, a key feature of the present teaching is that blooming and ghost image effects in a LiDAR detector are reduced by reducing the intensity of light that falls on pixels that are outside a central region, or spot, in the image plane that is associated with a real object image. An apodized aperture is chosen to provide a desired modulation to overlapped light rays that originate from an object and that are projected by optical elements at the input of the LiDAR. This desired modulation results in lower intensities in regions away from the central focus region of detector optics that project the modulated overlapped light rays to a detector plane. A two-dimensional pixelated detector array is positioned in the image plane that receives the projected modulated overlapped light rays. In some embodiments, the desired modulation provided by the apodized aperture is chosen so that a desired ratio of an intensity of the projected modulated light rays on one pixel of a two-dimensional array of pixels to an intensity of the projected modulated light rays on an adjacent pixel of the two-dimensional array of pixels is achieved. The desired ratio can be a ratio that reduces the effects of blooming in the two-dimensional pixelated detector array. Said another way, LiDAR systems of the present teaching utilize apodized apertures that modulate the intensity across a focused collection of overlapping light rays reflected off an object such that the ratio of an intensity in projected optical beam tails that extend beyond the apparent size of the focused light when those modulated focused collection of overlapping light rays is projected onto a pixelated detector array by detector optics to an intensity that is within the apparent size of the focused light is set to a desired ratio. This desired ratio can be low enough to reduce blooming in the pixelated detector array.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A LiDAR receiver comprising:

a) an input that is configured to receive light rays from objects illuminated by a LiDAR transmitter;

b) an optical element positioned adjacent to the input and configured with an optical power that projects light rays received at the input to a region where the received light rays overlap;

c) an apodized aperture positioned in the region where the received light rays overlap, the apodized aperture configured with an optical transmission profile that changes radially across the apodized aperture so as to provide a desired modulation of the overlapped received light rays;

d) detector optics positioned adjacent to the apodized aperture that receives the modulated light rays, the detector optics having an optical power and position that projects the modulated light rays at a detector plane; and e) a two-dimensional pixelated detector array positioned at the detector plane, wherein the desired modulation is chosen so that a desired ratio of an intensity of the projected modulated light rays on one pixel of the two-dimensional array of pixels to an intensity of the projected modulated light rays on an adjacent pixel of the two-dimensional array of pixels is achieved.

2. The LiDAR receiver of claim 1 wherein the apodized aperture comprises a gradient filter.

3. The LiDAR receiver of claim 1 wherein the apodized aperture is configured with increasing optical transmission in a radial direction towards a center of the apodized aperture.

4. The LiDAR receiver of claim 3 wherein the optical transmission increases linearly in the radial direction towards the center.

5. The LiDAR receiver of claim 3 wherein the optical transmission increases in the radial direction towards the center according to a mathematical function related to an optical beam profile.

6. The LiDAR receiver of claim 1 wherein the apodized aperture is configured to provide a desired gradient in optical transmission for a Gaussian optical beam.

7. The LiDAR receiver of claim 1 wherein the apodized aperture is configured to reduce diffraction effects occurring at an edge of the apodized aperture.

8. The LiDAR receiver of claim 1 wherein the apodized aperture reduces intensity of higher order optical modes at an edge of the apodized aperture.

9. The LiDAR receiver of claim 1 wherein the pixelated detector array comprises a single-photon avalanche diode array.

10. The LiDAR receiver of claim 1 wherein the detector plane is positioned at a focal point of the detector optics.

11. A method of LiDAR detection, the method comprising:

a) receiving light rays from objects illuminated by a LiDAR transmitter;

b) projecting light rays received from objects illuminated by a LiDAR transmitter to a region where the received light rays overlap;

c) transmitting overlapped light rays through an apodized aperture having an optical transmission profile across the apodized aperture that modulates the overlapped light rays so as to provide a desired modulation of the overlapped received light rays; and d) projecting the modulated overlapped light rays to a two-dimensional pixelated detector array positioned at a detector plane so that a desired ratio of an intensity of the projected modulated light rays on one pixel of the two-dimensional pixelated detector array to an intensity of the projected modulated light rays on an adjacent pixel of the two-dimensional pixelated detector array is achieved.

12. The method of claim 11 further comprising selecting the optical transmission profile across the apodized aperture so that it gradually decreases optical transmission from a center of the aperture radially to an edge.

13. The method of claim 12 wherein the transmission profile decreases linearly from the center of the apodized aperture radially to the edge.

14. The method of claim 12 wherein the transmission profile decreases from the center of the apodized aperture radially to the edge according to a predetermined mathematical function.

15. The method of claim 14 wherein the mathematical function is related to an optical beam profile of the light rays received from objects illuminated by the LiDAR transmitter.

16. The method of claim 15 wherein the optical beam profile is a Gaussian optical beam profile.

17. The method of claim 11 further comprising selecting the optical transmission profile across the apodized aperture so that there is reduced intensity of higher order optical modes at an edge of the aperture.

18. The method of claim 11 further comprising positioning the detector plane at a focal point of detector optics.

19. The method of claim 11 wherein the desired ratio is greater than $10^3$.

20. The method of claim 11 wherein the desired ratio is greater than $10^4$.

21. The method of claim 11 wherein the desired ratio is greater than $10^5$.

22. The method of claim 11 wherein a dimension of at least one pixel of the two-dimensional pixelated detector array is in a range of 15 microns to 45 microns.

* * * * *